Feb. 6, 1940. C. E. WEAVER 2,189,093
LANDING GEAR FOR AIRCRAFT
Filed Nov. 30, 1937 3 Sheets-Sheet 2
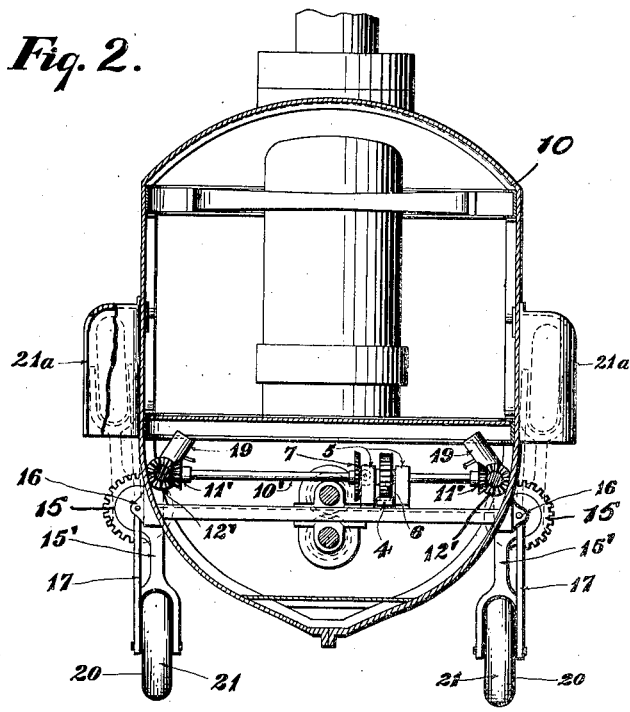
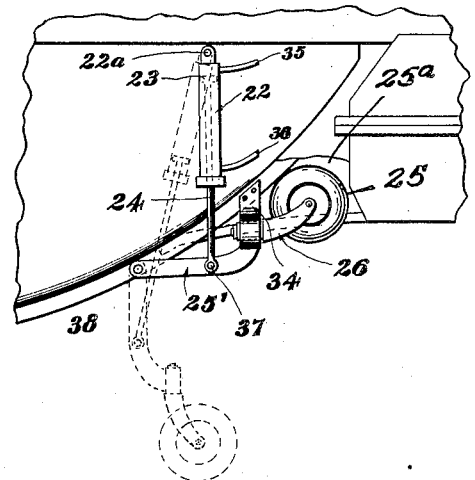
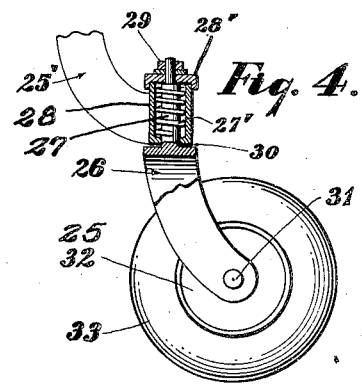
Inventor
Charles E. Weaver
Christine R. Nielsen,
Attorney Feb. 6, 1940. C. E. WEAVER 2,189,093
LANDING GEAR FOR AIRCRAFT
Filed Nov. 30, 1937 3 Sheets-Sheet 3
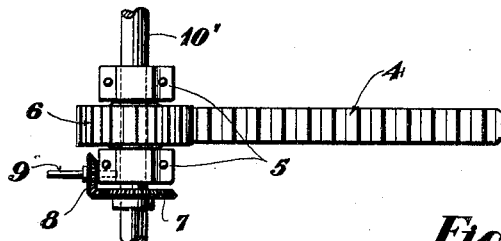
Fig. 5.
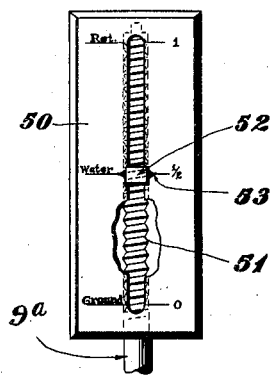
Fig. 6.
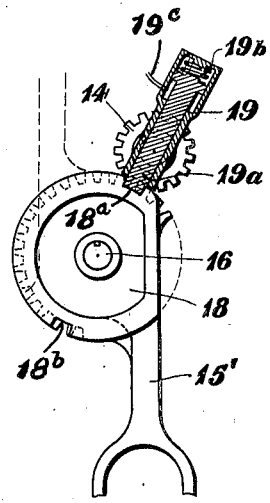
Fig. 7.
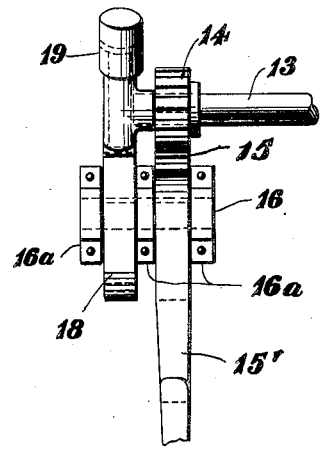
Fig. 8.
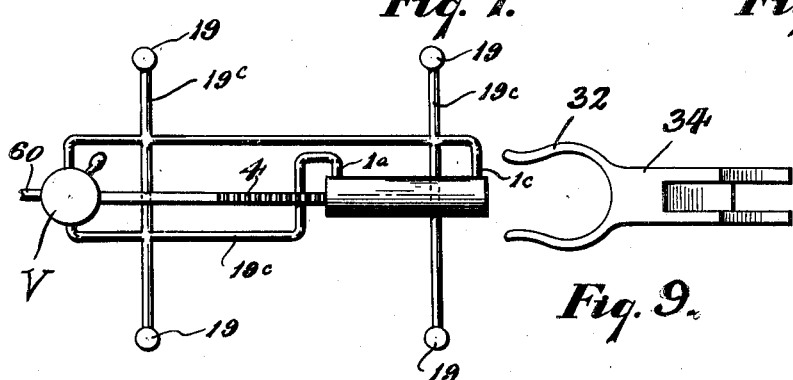
Fig. 10.
Fig. 9.
Inventor
Charles E. Weaver
Christian R. Nielsen,
Attorney Patented Feb. 6, 1940

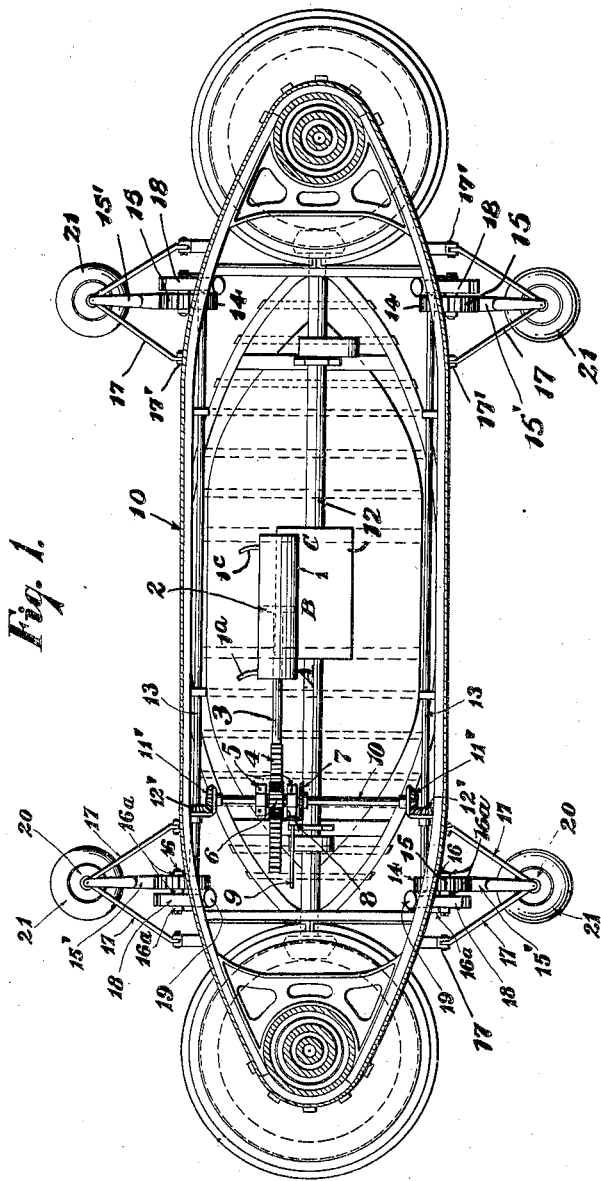

2,189,093

UNITED STATES PATENT OFFICE 2,189,093

LANDING GEAR FOR AIRCRAFT

Charles E. Weaver, Watertown, N. Y.

Application November 30, 1937, Serial No. 177,363

1 Claim. (Cl. 244—102)

This invention relates to landing gear for aircraft of the type disclosed in my patent numbered 2,078,823, issued April 27, 1937, and it consists in the constructions, arrangements and combinations herein described and claimed.

It is the cardinal purpose of the invention to provide a landing gear embodying buoyant wheels movable to a position to act as pontoons or floats for the purpose of stabilizing the craft when alighting upon water, and also movable to a position within suitable housings for the purpose of reducing air resistance.

It is also an object of the invention to provide a landing gear which may be controlled entirely from the pilot's cabin through air pressure means, and in which visual indicator means are simultaneously operated with movement of the gear to indicate to the pilot the exact position of the landing gear.

It is a still further object of the invention to provide means in which shock to the craft and operating means for the landing gear is cushioned, especially when landing upon water.

Additional objects, advantages and features of invention will be apparent from the following description considered in conjunction with the accompanying drawings, wherein—

Figure 1 is a longitudinal sectional view of a craft constructed in accordance with my invention, showing the landing gear as used when alighting upon water.

Figure 2 is an enlarged cross sectional view illustrating the gear in position for alighting upon land.

Figure 3 is a detail, in side elevation, of one of the landing wheels.

Figure 4 is an enlarged fragmentary view thereof, partly in section, illustrating the mounting of the wheel.

Figure 5 is a longitudinal sectional view of the air cylinder and associated means for actuating the landing gear and the visual indicator means.

Figure 6 is a plan view of the indicator means, partly broken away.

Figure 7 is a sectional view illustrating the air-release lock for certain of the landing wheels.

Figure 8 is a side elevation thereof.

Figure 9 is a top plan view of a clip employed for maintaining the fifth wheel in raised position.

Figure 10 is a plan view of the lock operating means.

Attention is first invited to Figures 1 and 2 wherein I have illustrated a craft 10 having fore and aft rotors not shown driven by means of a prime mover and shafting 12. The operation of the rotors for raising of the craft has been fully explained in my prior Patent No. 2,078,823 and it is not believed necessary to discuss the operation here for proper understanding of the landing gear mechanism, which will now be described.

Within the body of the craft 10, along each longitudinal side there is revolubly mounted a driven shaft 13, terminating inwardly of the fore and aft ends of the body. The shafts 13 are spaced close to respective sides of the body and upon the ends thereof respective gears 14 are keyed, adapted to mesh with respective segmental gears 15 journalled upon a shaft 16 disposed upon the exterior of the body 10. The shafts 16 are revolubly mounted between bearings 16a.

Each of the segmental gears 15 includes an arm 15' forked at its free end and between the forks there is revolubly mounted a wheel 20 having a buoyant tire 21. The tires are preferably pneumatic, of the balloon or mushroom type so that in the horizontal position of the wheels the tires will act as pontoons or stabilizers when landing on water.

The arms 15' are of such length as to extend well below the bottom of the craft to maintain the craft above the ground when the wheels are in the vertical positions for use upon land, and in order to afford stability to the arms 15' diagonal braces 17 are employed, one end being connected to the axles of the wheels while the other ends are swingably connected at 17' to the sides of the craft.

From the foregoing, it will be seen that four landing wheels are employed, two upon either side of the craft, and that the wheels and the arms 15' are swingable from a vertical position as shown in Figure 2 to a horizontal position, as shown in Figure 1, and movable still further to a housed position, as indicated in dotted lines in Figure 2.

In order that the wheels 20 and their associated arms 15' may be positively retained in either of the positions stated, I have provided a locking segment 18, one for each arm 15' and this segment is keyed to the shaft 16, as clearly shown in Figure 7. In the periphery of the segment, at suitable points, there are formed notches 18a and 18b cooperable with a detent plunger 19a reciprocably mounted within a cylinder 19. In the position shown in Figure 7, the notch 18a functions to maintain the wheel in its vertical position, but with release of the plunger 19a the segment, upon rotation of the shaft 16, will be moved so that the notch 18b will receive the plunger 19a and thus hold the arm 15' in the vertical upward position.

The cylinder 19 is enlarged at its outer end to accommodate a piston head of the plunger 19a, the latter normally occupying a position intermediate the length of the enlargement, and a helical spring 19b is interposed between the head and the closed end of the cylinder, the spring being of such strength as to force the plunger into the notches 18a and 18b, as the case may be. The enlarged portion of the cylinder is tapped at a point below the piston head and receives a pipe 19c, admitting air below the head, acting against the spring 19b for the purpose of raising the plunger 19a and releasing the segment 18, the spring 19b projecting the plunger upon release of the air, as will be understood, as the description proceeds.

In order that the arms 15' and associated wheels 20 may be moved from their vertical positions as shown in Figure 2 to a horizontal position shown in Figure 1, and vice versa, a gear 12' is fixed to each shaft 13, in mesh with respective gears 11' keyed to a transversely extended shaft 10'. The shaft 10' is revolubly supported in bearings 5 mounted upon the sub-frame of the craft. A spur gear 6 is keyed to the shaft 10' positioned between the spaced bearings 5 and a rack bar 4 is meshed with the gear 6 upon its lower periphery, the rack bar being suitably supported and maintained in mesh with the gear, in any approved manner. The rack bar 6 includes a piston rod 3 having a head 2 reciprocably disposed within a master air cylinder 1. The cylinder 1 is tapped at the ends to receive air pipes 1a and 1c.

From the foregoing, it will be seen that upon admission of air to the cylinder through either of the pipes 1a and 1c, the piston will be reciprocated, imparting rotation of the shafts 10' and 13. Obviously, the arms 15' will be given a movement dependent upon the direction of movement of the piston.

In the retracted position of the landing gear, the wheels 20 will be housed within cowled pocket members 21a on the cabin, the pockets being open upon their sides as at 21b, to permit the wheels to be swung into and out of the same.

It is of course, important that the pilot shall know just what position the landing gear may have been moved to and this should be imparted simultaneously with movement of the landing gear. Therefore, a bevel gear 7 is keyed to the shaft 10' in mesh with a similar gear 8 which may be supported in any suitable bearing. The gear 8 has fixed thereto a shaft 9 which is suitably geared to a shaft 9a of an indicator 50.

The indicator 50 in the present instance comprises a panel suitably slotted to define a passageway for a collar 52, the latter having a pointer 53. The shaft 9a has a threaded portion 51 cooperable with threads of the collar 52 and therefore it will be seen that as the shaft 9a is rotated, the collar will be caused to move longitudinally along the passageway, the pointer cooperating with calibrations on the panel to indicate the positions of the landing gear, such as "ground," "water," or "retracted."

A fifth wheel 25 is provided upon the rear of the craft, and is normally retracted as shown in full lines in Figure 3, into a central longitudinal pocket 25a beneath the craft. This wheel is adapted to be projected into the dotted line position shown in Figure 3 when it is desired to taxi. The wheel is journalled on an axle 31 carried by a fork 26 from which a post 27 rises. The post 27 is pivoted within a bearing 28 secured in place by a screw cap means 28' engaging a screw stud 29 on the post 27. The bearing 28 is carried by a lever 25' pivoted at 38 along the center line of the hull of the craft. Within the bearing 28 is a coil spring 27' fastened at one end to the post 27 and at the other end to the bearing 28, being so tensioned as to normally maintain the wheel 25 in a straight ahead position, but permitting the same to yield when striking an obstruction and thereafter to return to normal position. The lever 25' and wheel 25 are adapted to be raised and lowered by a piston means generally indicated at 22. This means comprises a cylinder pivoted at 22a to the craft, and at opposite ends has pipe connections 35 and 36 to admit and exhaust air from a suitable control valve (not shown). A piston 23 is reciprocable within the cylinder intermediate the pipe connections 35—36, and a rod 24 extends therefrom and is pivoted at 37 to the lever 25'. According to the direction of admission of air to the pipe connections 35—36 against the piston 23, the lever 25' will be raised and lowered and the wheel 25 correspondingly raised and lowered. This wheel is also preferably provided with a pneumatic balloon or mushroom tire, as at 33. In order that the wheel 25 and lever 25' may be maintained in its raised position, a clip 34 is secured to the craft, having split resilient arms 32 between which the bearing 28 may be engaged.

Attention is now invited to Figure 10 of the drawings, wherein I have illustrated diagrammatically the various air lock cylinders 19, the master cylinder 1 and control valve V. The valve V will be only briefly described herein since the structure of the valve constitutes the subject matter of a separate application. The valve V includes an air intake port 60, the air being supplied from any suitable source and an operating lever 61 for actuating a suitable valve (not shown), for controlling flow of air through the pipes 19c to the various cylinders 19 for retracting the plungers 19a and releasing the arms 15' for movement to a desired position, and at the same time admit air through the pipe 1c to the master cylinder 1 to cause movement of the piston 2 from the position C to the point B or A, depending upon the degree of movement which is to be imparted to the rack bar. A further position of the operating lever 61 will cause pipe 1a to admit air to the cylinder 1, the pipe 1c then acting to exhaust air back to the valve V.

As an illustration of the operation with air admitted through the pipe 1c, the piston 2 will be moved to the position A in which the landing gear will have been moved to a retracted position within the cowls 21a, the pipe 1a acting as an exhaust for the air; but when air is admitted through pipe 1a, the landing gear will be moved from the retracted position to a vertical or ground landing position, the piston having been moved from A to C, as indicated in Figure 5.

The valve V will include an intermediate or equalizing position whereby the piston 2 may be caused to assume the position B (see Figure 5) and in this position of the valve, the landing gear will be in a horizontal position such as required for landing upon water, and in this position, there will be in effect cushioned pockets upon opposite sides of the piston 2, reducing jar and shocks to the landing gear, gears and rack bar of the mechanism. Obviously, the landing gear may be moved selectively from one position to another.

Since the visual indicator means is directly driven from the rack bar 4 by means of the shaft 10', gears 7—8 and shafts 9 and 9a the indicator pointer 53 will be moved to indicate the position of the landing gear.

While I have shown and described a particular embodiment of the invention, this is by way of illustration only, and I consider as my own all such modifications in structure as fairly fall within the scope of the appended claim.

I claim:

In an aircraft, an elongated body, spaced bearings on the longitudinal sides of the body, an arm swingably mounted in each bearing, each arm having a revoluble buoyant wheel, a gear segment on each arm, a revoluble shaft journalled along each longitudinal side of the body, a gear on the ends of the shafts in mesh with respective gear segments, a bevel gear fixed to each shaft, a revoluble shaft transversely of the body, and having a bevel gear in mesh with respective first named bevel gears, a pinion on the transverse shaft, a gear drive associated with the transverse shaft, a visual indicator means connected to the gear drive, an air cylinder, a piston therein having a toothed rack bar, the teeth thereof being in mesh with the pinion of the transverse shaft, said cylinder having a hose connection at the ends for admission and exhaust of air for reciprocating the piston, a notched segment associated with each segmental gear, a cylinder adjacent each arm, each cylinder having a spring-pressed piston, the rod of which is selectively engageable with the notches of the segment, the cylinders having air inlet means below the piston whereby to admit air to release the rod from an engaged notch.

CHARLES E. WEAVER.